US012585845B2

(12) United States Patent
  Bandyopadhyay et al.

(10) Patent No.:  US 12,585,845 B2
(45) Date of Patent:   Mar. 24, 2026

(54) FUSION OF PHYSICS AND AI BASED MODELS FOR END-TO-END DATA SYNTHESIZATION AND VALIDATION

(71) Applicant: Tata Consultancy Services Limited, Mumbai (IN)

(72) Inventors: Soma Bandyopadhyay, Kolkata (IN); Tapas Chakravarty, Kolkata (IN); Arpan Pal, Kolkata (IN); Chirabrata Bhaumik, Kolkata (IN); Riddhi Panse, Bangalore (IN); Anish Datta, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 919 days.

(21) Appl. No.: 17/813,061

(22) Filed: Jul. 18, 2022

(65) Prior Publication Data
    US 2023/0130703 A1      Apr. 27, 2023

(30) Foreign Application Priority Data
  Sep. 7, 2021    (IN) .............................. 202121040563

(51) Int. Cl.
   *G06F 30/23*       (2020.01)
   *G06F 30/27*       (2020.01)
   *G06F 119/02*      (2020.01)
(52) U.S. Cl.
   CPC .............. *G06F 30/23* (2020.01); *G06F 30/27* (2020.01); *G06F 2119/02* (2020.01)
(58) Field of Classification Search
   CPC ....... G06F 30/23; G06F 30/27; G06F 2119/02
   See application file for complete search history.

(56) References Cited

U.S. PATENT DOCUMENTS

2021/0125061 A1*   4/2021   Munoz Delgado .... G06N 3/045

FOREIGN PATENT DOCUMENTS

CN      108460152 A      8/2018
CN      111209695 A      5/2020
           (Continued)

OTHER PUBLICATIONS

Gao, Y., Liu, X., & Xiang, J. (2020). FEM simulation-based generative adversarial networks to detect bearing faults. IEEE Transactions on Industrial Informatics, 16(7), 4961-4971. (Year: 2020).*

(Continued)

*Primary Examiner* — Bijan Mapar
(74) *Attorney, Agent, or Firm* — Finnegan, Henderson, Farabow, Garrett & Dunner, LLP

(57)          ABSTRACT

In sensor data analytics, physics-based models generate high quality data. However, these models consume lot of time as they rely on physical simulations. On the other hand, generative learning takes much less time to generate data, and may be prone to error. Present disclosure provides system and method for generation of synthetic machine data for healthy and abnormal condition using hybrid of physics based and generative model-based approach. Finite Element Analysis (FEA) is used for simulating healthy and faulty parts in machinery with set of parameters and precondition(s). Small output data from FEA is fed into a generative model for generating synthesized data by learning data distribution knowledge and representing into latent space. Rule engine is built using statistical features wherein realistic bounds serve as faulty data indicators. Synthesized data which does not satisfies features bounds are discarded. Further, AI-based validation framework is used to analyze quality of synthesized data.

7 Claims, 6 Drawing Sheets

(56) References Cited

FOREIGN PATENT DOCUMENTS

| | | | |
|---|---|---|---|
| CN | 111475987 | A | 7/2020 |
| CN | 112560300 | A | 3/2021 |
| EP | 3611588 | A1 | 2/2020 |
| WO | WO2020222879 | A1 | 11/2020 |

OTHER PUBLICATIONS

Xiaoyang Liu et al., "A Personalized Diagnosis Method to Detect Faults in a Bearing Based on Acceleration Sensors and an FEM Simulation Driving Support Vector Machine," Sensors, Jan. 2020, vol. 20 (2), MDPI, https://www.mdpi.com/1424-8220/20/2/420.

* cited by examiner

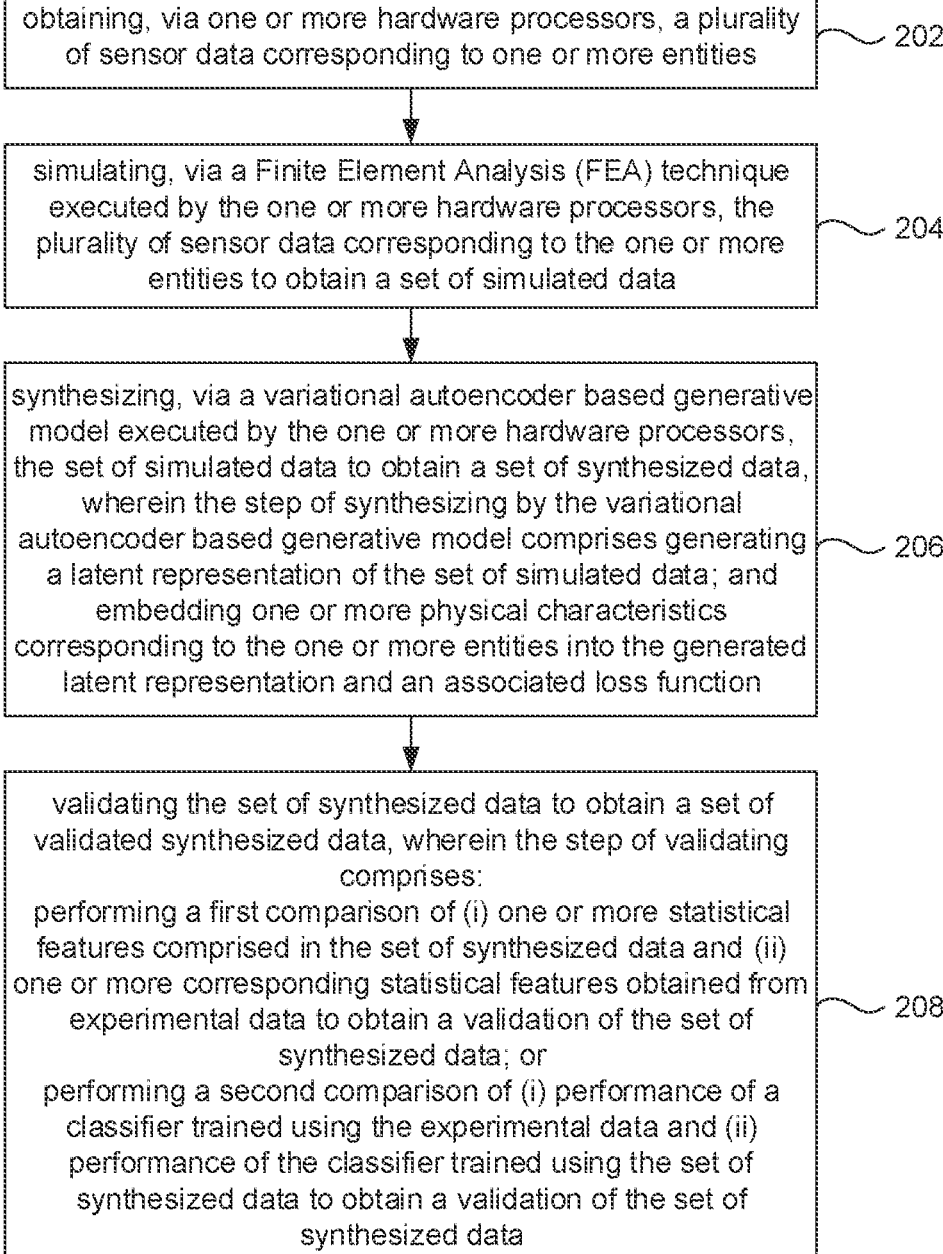

obtaining, via one or more hardware processors, a plurality of sensor data corresponding to one or more entities ~ 202 simulating, via a Finite Element Analysis (FEA) technique executed by the one or more hardware processors, the plurality of sensor data corresponding to the one or more entities to obtain a set of simulated data ~ 204 synthesizing, via a variational autoencoder based generative model executed by the one or more hardware processors, the set of simulated data to obtain a set of synthesized data, wherein the step of synthesizing by the variational autoencoder based generative model comprises generating a latent representation of the set of simulated data; and embedding one or more physical characteristics corresponding to the one or more entities into the generated latent representation and an associated loss function ~ 206 validating the set of synthesized data to obtain a set of validated synthesized data, wherein the step of validating comprises:
performing a first comparison of (i) one or more statistical features comprised in the set of synthesized data and (ii) one or more corresponding statistical features obtained from experimental data to obtain a validation of the set of synthesized data; or
performing a second comparison of (i) performance of a classifier trained using the experimental data and (ii) performance of the classifier trained using the set of synthesized data to obtain a validation of the set of synthesized data ~ 208

FIG. 3

FUSION OF PHYSICS AND AI BASED MODELS FOR END-TO-END DATA SYNTHESIZATION AND VALIDATION

PRIORITY CLAIM

This U.S. patent application claims priority under 35 U.S.C. § 119 to: Indian Patent Application No. 202121040563, filed on Sep. 7, 2021. The entire contents of the aforementioned application are incorporated herein by reference.

TECHNICAL FIELD

The disclosure herein generally relates to sensor data synthetization and validation thereof, and, more particularly, to fusion of physics and AI based model for end-to-end data synthesization and validation.

BACKGROUND

In sensor data analytics, physics-based models generate high quality data close to real world. However, these models consume a lot of time in terms of processing the sensor data as they rely on physical simulations. On the other hand, generative learning takes much less time to generate data, however learning to generate the data of near real time is a challenge.

SUMMARY

Embodiments of the present disclosure present technological improvements as solutions to one or more of the above-mentioned technical problems recognized by the inventors in conventional systems. For example, in one aspect, there is provided a processor implemented method for fusion of physics and AI based model for end-to-end data synthesization and validation. The method comprises obtaining, via one or more hardware processors, a plurality of sensor data corresponding to one or more entities, wherein the one or more entities correspond to at least one of one or more (IoT) machines, and one or more components of the one or more (IoT) machines; simulating, via a Finite Element Analysis (FEA) technique executed by the one or more hardware processors, the plurality of sensor data corresponding to the one or more entities to obtain a set of simulated data; synthesizing, via a variational autoencoder based generative model executed by the one or more hardware processors, the set of simulated data to obtain a set of synthesized data, wherein the step of synthesizing by the variational autoencoder based generative model comprises: generating a latent representation of the set of simulated data; and embedding one or more physical characteristics corresponding to the one or more entities into the generated latent representation and an associated loss function; and validating the set of synthesized data to obtain a set of validated synthesized data, wherein the step of validating comprises: performing a first comparison of (i) one or more statistical features comprised in the set of synthesized data and (ii) one or more corresponding statistical features obtained from experimental data to obtain a validation of the set of synthesized data; or performing a second comparison of (a) performance of a classifier trained using the experimental data and (b) performance of the classifier trained using the set of synthesized data to obtain a validation of the set of synthesized data.

In an embodiment, the plurality of sensor data corresponds to a type of fault, nature of fault, location of fault, and geometrical data of the fault.

In an embodiment, the step of synthesizing the set of simulated data comprises synthesizing healthy and faulty sensor data comprised in the set of simulated data.

In an embodiment, the step of simulating the plurality of sensor data corresponding to the one or more entities to obtain a set of simulated data is further based on a real sensor dataset of a pre-defined quantity.

In an embodiment, the one or more physical characteristics comprise at least one of elasticity, Young's modulus, Poisson's ratio, Addendum coefficient, pressure angle, a hub bore radius, a face width, and a tip clearance coefficient.

In another aspect, there is provided a system for fusion of physics and AI based model for end-to-end data synthesization and validation. The system comprises a memory storing instructions; one or more communication interfaces; and one or more hardware processors coupled to the memory via the one or more communication interfaces, wherein the one or more hardware processors are configured by the instructions to: obtain a plurality of sensor data corresponding to one or more entities, wherein the one or more entities correspond to at least one of one or more (IoT) machines, and one or more components of the one or more (IoT) machines; simulate, via a Finite Element Analysis (FEA) technique, the plurality of sensor data corresponding to the one or more entities to obtain a set of simulated data; synthesize, via a variational autoencoder based generative model, the set of simulated data to obtain a set of synthesized data, wherein the set of synthesized data is obtained by: generating a latent representation of the set of simulated data; and embedding one or more physical characteristics corresponding to the one or more entities into the generated latent representation and an associated loss function; and validate the set of synthesized data to obtain a set of validated synthesized data, wherein the set of validated synthesized data is obtained by: performing a first comparison of (i) one or more statistical features comprised in the set of synthesized data and (ii) one or more corresponding statistical features obtained from experimental data to obtain a validation of the set of synthesized data; or performing a second comparison of (i) performance of a classifier trained using the experimental data and (ii) performance of the classifier trained using the set of synthesized data to obtain a validation of the set of synthesized data.

In an embodiment, the plurality of sensor data corresponds to a type of fault, nature of fault, location of fault, and geometrical data of the fault.

In an embodiment, the set of simulated data is obtained by synthesizing healthy and faulty sensor data comprised in the set of simulated data.

In an embodiment, the set of simulated data obtained is further based on a real sensor dataset of a pre-defined quantity.

In an embodiment, the one or more physical characteristics comprise at least one of elasticity, Young's modulus, Poisson's ratio, Addendum coefficient, pressure angle, a hub bore radius, a face width, and a tip clearance coefficient.

In yet another aspect, there are provided one or more non-transitory machine-readable information storage mediums comprising one or more instructions which when executed by one or more hardware processors cause a method for fusion of physics and AI based model for end-to-end data synthesization and validation. The method comprises obtaining, via one or more hardware processors, a plurality of sensor data corresponding to one or more entities, wherein the one or more entities correspond to at least one of one or more (IoT) machines, and one or more components of the one or more (IoT) machines; simulating, via a Finite Element Analysis (FEA) technique executed by the one or more hardware processors, the plurality of sensor data corresponding to the one or more entities to obtain a set of simulated data; synthesizing, via a variational autoencoder based generative model executed by the one or more hardware processors, the set of simulated data to obtain a set of synthesized data, wherein the step of synthesizing by the variational autoencoder based generative model comprises: generating a latent representation of the set of simulated data; and embedding one or more physical characteristics corresponding to the one or more entities into the generated latent representation and an associated loss function; and validating the set of synthesized data to obtain a set of validated synthesized data, wherein the step of validating comprises: performing a first comparison of (i) one or more statistical features comprised in the set of synthesized data and (ii) one or more corresponding statistical features obtained from experimental data to obtain a validation of the set of synthesized data; or performing a second comparison of (i) performance of a classifier trained using the experimental data and (ii) performance of the classifier trained using the set of synthesized data to obtain a validation of the set of synthesized data.

In an embodiment, the plurality of sensor data corresponds to a type of fault, nature of fault, location of fault, and geometrical data of the fault.

In an embodiment, the step of synthesizing the set of simulated data comprises synthesizing healthy and faulty sensor data comprised in the set of simulated data.

In an embodiment, the step of simulating the plurality of sensor data corresponding to the one or more entities to obtain a set of simulated data is further based on a real sensor dataset of a pre-defined quantity.

In an embodiment, the one or more physical characteristics comprise at least one of elasticity, Young's modulus, Poisson's ratio, Addendum coefficient, pressure angle, a hub bore radius, a face width, and a tip clearance coefficient.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 3 depicts an exemplary flow chart illustrating a method for fusion of physics and AI based models for end-to-end data synthesization and validation, using the system of FIG. 1, in accordance with an embodiment of the present disclosure.

4

Figure 4:
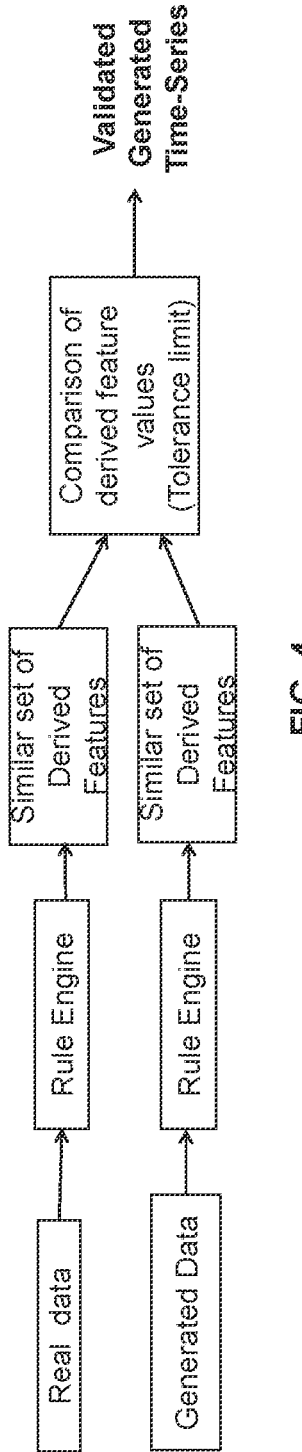

FIG. 4 depicts a block-diagram illustrating the rule engine-based validation approach for validation of the set of synthesized data, in accordance with an embodiment of the present disclosure.

Figure 5:
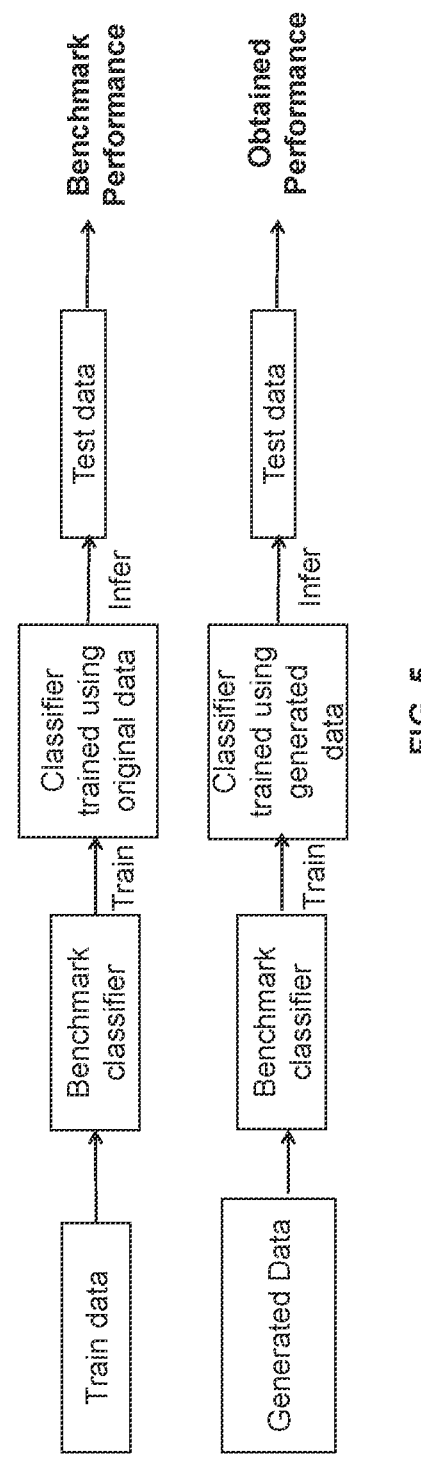

FIG. 5 depicts a block-diagram illustrating the AI-based validation technique for validation of the set of synthesized data, in accordance with an embodiment of the present disclosure.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

In sensor data analytics, physics-based models generate high quality data. However, these models consume a lot of time in terms of processing the sensor data as they rely on physical simulations. On the other hand, generative learning takes much less time to generate data, however, this model may be prone to error. Embodiments of the present disclosure provide system and method for generation of synthetic machine data for healthy and abnormal condition using hybrid of physics based and generative model-based approach. More specifically, Finite Element Analysis (FEA) is used for simulation of data for healthy and faulty parts in machinery. FEA based simulations is used to generate data for a certain set of configurations involving normal and fault conditions with a unique set of parameters and pre-condition. As FEA takes a huge amount of time to generate data, a small output data from FEA is fed into a generative model which explodes the amount of data generated. Using this huge amount of generated data, much robust deep learning models can be trained for better fault diagnosis. The method of the present disclosure further involves a robust dual validation framework wherein a rule engine is built using statistical features wherein their realistic bounds act as indicators of faulty data. The generated data which do not satisfies the bounds of features in the rule engine are discarded. Further, AI-based validation framework is used to analyze the quality of the generated data.

Referring now to the drawings, and more particularly to FIG. 1 through 5, where similar reference characters denote corresponding features consistently throughout the figures, there are shown preferred embodiments and these embodiments are described in the context of the following exemplary system and/or method.

Figure 1:
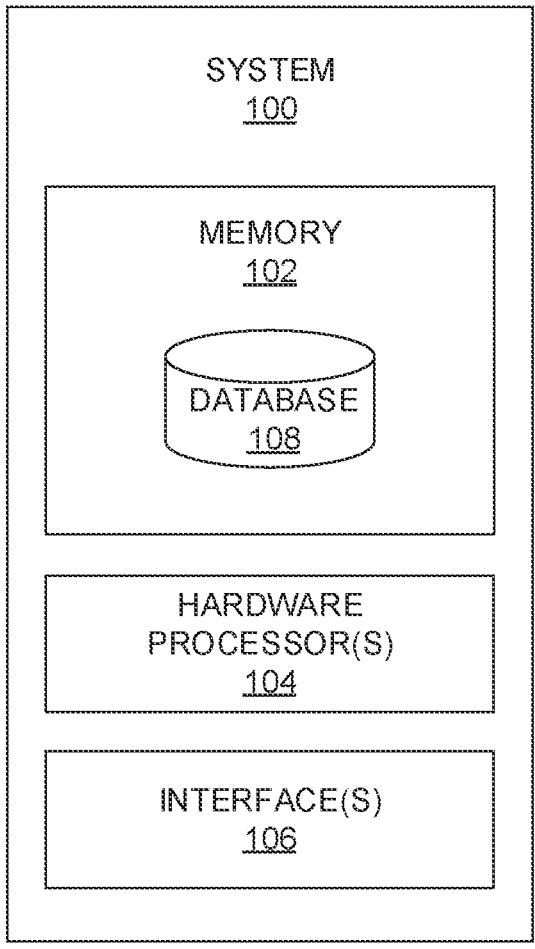
FIG. 1 depicts an exemplary system for fusion of physics and AI based models for end-to-end data synthesization and validation, in accordance with an embodiment of the present disclosure.

FIG. 1 depicts an exemplary system 100 for fusion of physics and AI based model for end-to-end data synthesization and validation, in accordance with an embodiment of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices (e.g., smartphones, tablet phones, mobile communication devices, and the like), workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic-random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises sensor data obtained from various entities (e.g., machines, or components of the machines, Internet of Things (IoT) devices, IoT components, and the like. The database 108 further comprises simulated sensor data, synthesized sensor data, latent representation of the set of simulated data, one or more physical characteristics corresponding to the one or more entities, validated data, and the like. Furthermore, the database 108 stores (i) one or more statistical features comprised in the set of synthesized data and (ii) one or more corresponding statistical features obtained from experimental data. The memory 102 further stores one or more techniques such as Finite Element Analysis (FEA) technique(s), Variational Auto-Encoder (VAE) based generative model, and the like which when executed by the system 100 perform the method described herein. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2A:
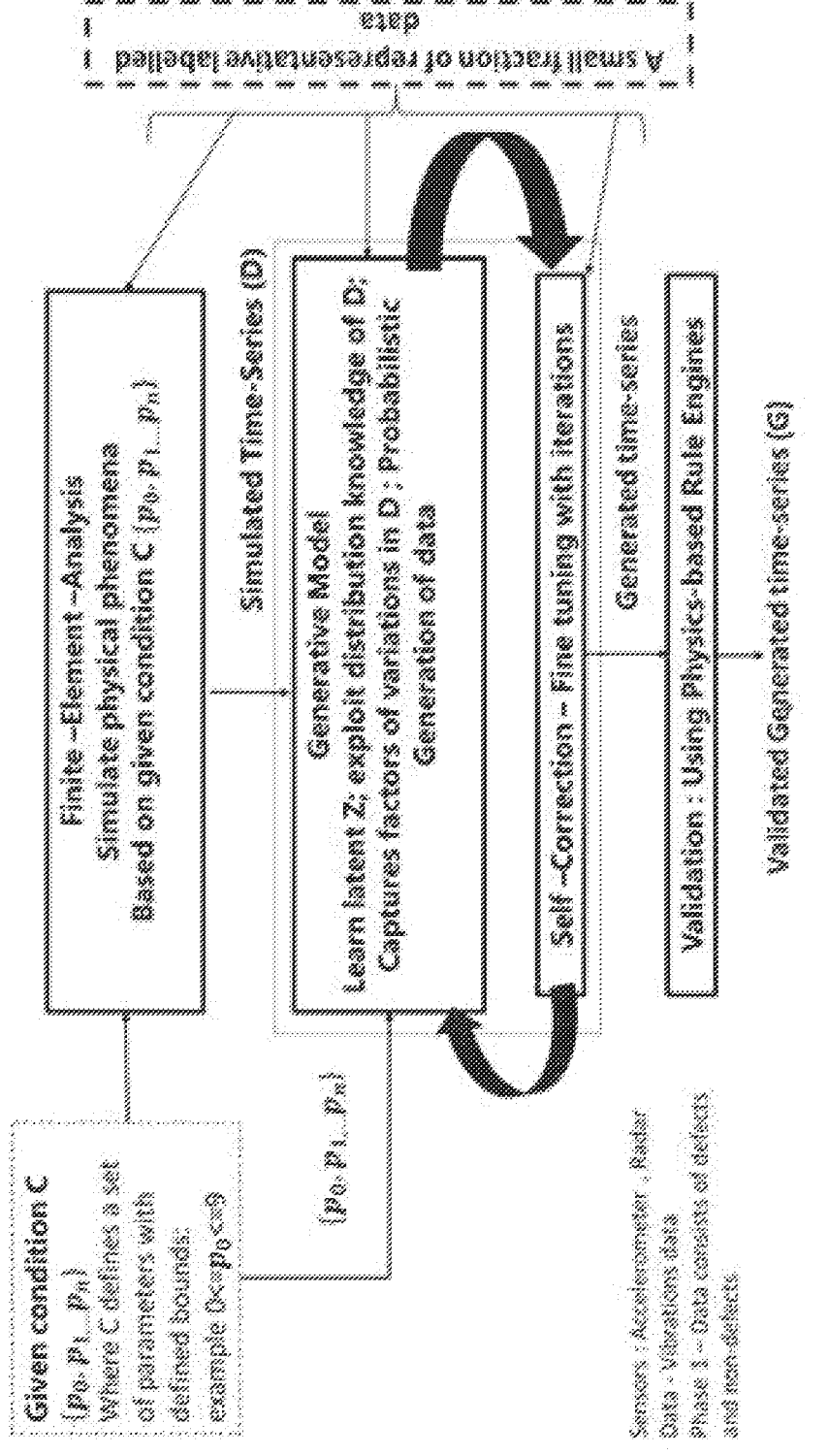
FIGS. 2A and 2B depict an exemplary high level block diagram of the system for fusion of physics and AI based models for end-to-end data synthesization and validation, in accordance with an embodiment of the present disclosure.
Figure 2B:
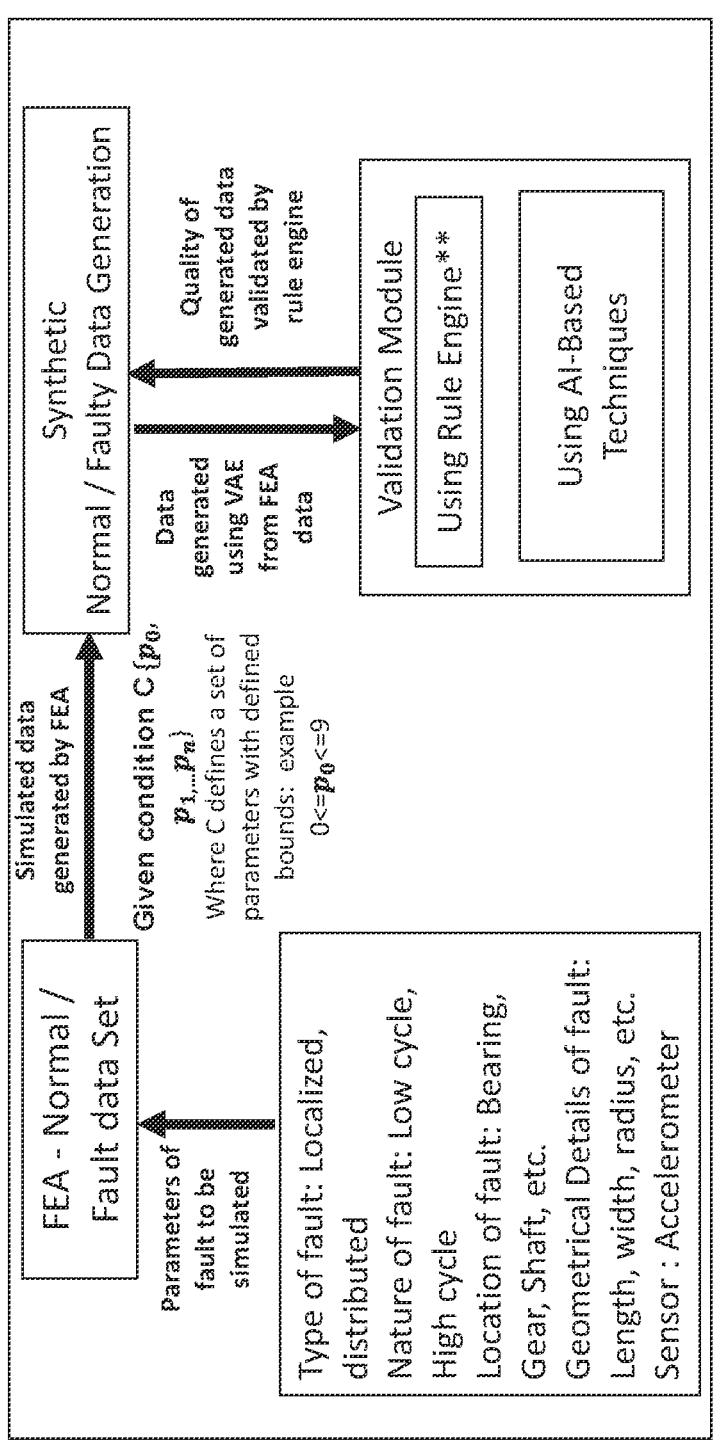

FIGS. 2A and 2B, with reference to FIG. 1, depict an exemplary high level block diagram of the system 100 for fusion of physics and AI based model for end-to-end data synthesization and validation, in accordance with an embodiment of the present disclosure.

FIG. 3, with reference to FIGS. 1-2B, depicts an exemplary flow chart illustrating a method for fusion of physics and AI based models for end-to-end data synthesization and validation, using the system 100 of FIG. 1, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, FIGS. 2A-2B, the flow diagram as depicted in FIGS. 3, FIG. 4, and FIG. 5. In an embodiment, at step 202 of the present disclosure, the one or more hardware processors 104 obtain, via the one or more hardware processors, a plurality of sensor data corresponding to one or more entities. The plurality of sensor data corresponds to Gear Fault Diagnosis Dataset, wherein the entity may be one or more gears of a machine. The plurality of sensor data includes a type of fault, nature of fault, location of fault, geometrical data of the fault, and the like. For instance, type of fault: Localized, distributed, nature of fault: Low cycle, High cycle, location of fault: Bearing, Gear, Shaft, etc., geometrical details of fault: Length, width, radius, etc., and sensor: Accelerometer, and the like. The plurality of sensor data further includes three types of gear condition occur in the dataset—healthy, One chipped tooth, and three worn teeth, in one embodiment of the present disclosure. In the experiments conducted by the present disclosure, vibrations were recorded using an accelerometer with 10 kHz sampling frequency. Further, each gear condition had 10 seconds of recordings. The continuous recordings were segmented into windows of 100 timesteps (10 ms). For the sake of brevity, the plurality of sensor data values is not shown herein. However, the source to the plurality of sensor data can be referred to a publicly available dataset at https://drive.google.com/file/d/0B4vlQFEs8N-cT3djQmwtV2NWSjg. It is to be understood by a person having ordinary skill in the art or person skilled in the art that the above examples of sensor data shall not be construed as limiting the scope of the present disclosure.

In an embodiment of the present disclosure, at step 204, the one or more hardware processors 104 simulate, via a Finite Element Analysis (FEA) technique, the plurality of sensor data corresponding to the one or more entities to obtain a set of simulated data. FEA is the simulation of a physical scenario using mathematical technique known as the Finite Element Method. Here, in the present disclosure, the FEA technique is used for simulation of working of machinery parts such as gear, shafts etc. The type of data to be simulated by FEA initially for our experimentation is mentioned below: Type of fault: Localized, distributed, Nature of fault: Low cycle, High cycle, Location of fault: Bearing, Gear, Shaft, etc., Geometrical Details of fault: Length, width, radius, etc., and Sensor: Accelerometer. The step of simulating the plurality of sensor data corresponding to the one or more entities to obtain the set of simulated data is further based on a real sensor dataset of a pre-defined quantity (e.g., 10-15% of input data—of 10-15% of the plurality of sensor data). Below Table 1 depicts simulated data for a specific sensor (acceleration sensor/accelerator) in X, Y, Z axis by way of examples:

TABLE 1

| Acceleration sensor values—X axis | | | | | | |
|---|---|---|---|---|---|---|
| 0 | −312915 | 7463325 | −2131745 | −1305917 | . . . | 2635.632 |
| 2671.568 | 2630.274 | 5479.227 | −345.202 | −1113.39 | . . . | −3525.232 |
| −3219.72 | −2705.04 | −425.566 | −3506.96 | −4880.92 | . . . | 2629.043 |

US 12,585,845 B2

7

TABLE 1-continued

| | | | | | | |
|---|---|---|---|---|---|---|
| 2531.106 | −27823.6 | −67421.6 | −1906.88 | 12093.71 | ... | 9629.916 |
| −1679.03 | 1562.73 | −5071.26 | −2535.98 | −2675.82 | ... | −1450.204 |
| ... | ... | ... | ... | ... | ... | ... |
| 5489.932 | 6075.422 | 3191.523 | 2027.039 | 2027.039 | ... | 10653.83 |

Acceleration sensor values—Y axis

| | | | | | | |
|---|---|---|---|---|---|---|
| 0 | 571449.1 | 13682270 | 38320060 | −10445130 | ... | 582.3979 |
| −41.1559 | 243.9261 | −41932.9 | 8799.02 | 2596.619 | ... | −9590.93 |
| −9891.16 | −30714.2 | 38023.1 | −622.706 | −46234.52 | ... | 1425.305 |
| −14172.5 | 72830.27 | 915650.7 | 54806.08 | 12282.52 | ... | −15543.1 |
| 541.3217 | −8911.62 | −9152.29 | 13671.49 | −4328.38 | ... | 11364.64 |
| ... | ... | ... | ... | ... | ... | ... |
| 57681.16 | −95328.8 | −37966.7 | −66283.7 | −66283.7 | ... | −37602.8 |

Acceleration sensor values—Z axis

| | | | | | | |
|---|---|---|---|---|---|---|
| 0 | 7405.549 | −178961 | −205334 | 228022.2 | ... | −9.26781 |
| 15.26294 | 86.78393 | −385.295 | 167.8126 | −48.523 | ... | 1.392992 |
| −30.3076 | −110.893 | 272.6506 | 116.4256 | −216.174 | ... | 42.10135 |
| −103.816 | 1688.729 | 10979.89 | −26.9093 | −0.32643 | ... | 0.28311 |
| −11.5391 | 4.509108 | −79.1338 | 98.77162 | −34.1862 | ... | 21.71576 |
| ... | ... | ... | ... | ... | ... | ... |
| 289.5697 | −540.126 | 26.71588 | 202.0783 | 202.0783 | ... | 8.151572 |

The above simulated data is obtained by collecting information on design of the machine, wherein geometry of solid of interest is specified via finite element mesh. Further, a constitutive law for the solid (e.g., material properties) is specified. Boundary conditions are also specified, for instance, nature of loading, contact, friction, and the like. Initial conditions are set, for example, for dynamic analysis (e.g., equations of motion of solid as a function of time), conditions may include, time, step size, number of modes, and the like. Upon providing and setting the above information, simulation is carried out by solving simulation equations (as known in the art) to obtain simulated data. More specifically, in the present disclosure, simulation was performed using FEA for gear-pair: Normal data and Faulty data (with subtle variations in fault locations). The FEA Simulated Data consisted of small amount of Acceleration data (3-axis), total simulated data duration from FEA: Normal data: 1 second (about 11,000 time-steps), Faulty data: 4 seconds (1 second for each subtle variation) (44,000 time-steps); segmented in windows of 128 timesteps. Normal instances: 69; Faulty instances: 349 each having 128-time steps.

In an embodiment of the present disclosure, at step 206, the one or more hardware processors 104 synthesize, via a variational autoencoder based generative model, the set of simulated data to obtain a set of synthesized data. The step of synthesizing the set of simulated data comprises synthesizing healthy and faulty sensor data comprised in the set of simulated data. The step of synthesizing by the variant of variational autoencoder based generative model further comprises generating a latent representation of the set of simulated data; and embedding one or more physical characteristics corresponding to the one or more entities into the generated latent representation and an associated loss function. Factorized latent representation is used to modify the Z along with mean and standard deviation. More specifically, the specific characteristics/features used in FEA and optimization function or loss function to be constructed include, Young's modulus, Poisson's ratio etc. which have been embedded to addresses the variation with respect to the characteristics of the fault design. Some of the one or more physical characteristics pertaining to the entities are illustrated by way of examples in below Table 2 and Table 3.

8

TABLE 2

Spur Gear data

| Sl. No. | Gear Configuration | No. of Teeth | Pitch Radius (mm) | Diameter (mm) | Face Width (mm) |
|---|---|---|---|---|---|
| 1 | Pinion | 64 | 40.6 | 81.28 | 25.4 |
| 2 | Gear | 116 | 73.7 | 147.3 | 25.4 |

TABLE 3

Tolerance for tooth errors

| Sl. No. | Gear Configuration | Tolerance for tooth errors (mm) | Tolerance for tooth profile (mm) |
|---|---|---|---|
| 1 | Pinion | 0.0254 | 0.0178 |
| 2 | Gear | 0.0229 | 0.0165 |

Young's modulus E (GPa) is 206 and Poisson's ratio 0.3 respectively for the above 2 gear types. For the sake of brevity, other physical characteristics such as Addendum coefficient, a pressure angle, a hub bore radius, a face width, and a tip clearance coefficient and their corresponding values are not described. Such examples shall not be construed as limiting the scope of the present disclosure.

In the present disclosure, generative model is used to capture the data distribution knowledge—Variants of Variational Auto-Encoder based generative model is used for synthesis of both healthy and Faulty data using a small portion of real experimental data/data generated using the FEA. A beta-VAE (beta value=1.5) which is a variant of Variational Auto-Encoder based generative model was used by the present disclosure for synthesizing the data and further consider the specific feature used in physical model (like young modulus) to simulate the faults was used as conditional prior and optimizing the loss function. The simulated data shown in Table 1 is min-max normalized and fed in the AI-based generative model (e.g., the variational autoencoder based generative model), in one embodiment of the present disclosure for synthesizing. More specifically, small amount of FEA generated data—[80 Instances: 35 Normal+45 faulty) was passed through generative model, in one embodiment of the present disclosure to generate synthetic data. A variant of Variational Auto-Encoder based generative model with latent dimension 12 is used for synthesis of both healthy and Faulty data using a small portion of real experimental data/data generated using the FEA. Long-Short-term-memory (LSTM) based architecture (as known in the art—not shown in FIGS.) is used for implementation of the VAE. Below Table 4 depicts synthetic data generated for the specific sensor (acceleration sensor/accelerator) in X, Y, Z axis by way of examples:

TABLE 4

| Acceleration sensor values—X axis | | | | | | |
|---|---|---|---|---|---|---|
| 0.609996 | 0.600116 | 0.59525 | 0.605107 | 0.609512 | . . . | 0.613522 |
| 0.608046 | 0.605143 | 0.614341 | 0.596634 | 0.611557 | . . . | 0.6108 |
| 0.603284 | 0.604432 | 0.62207 | 0.610487 | 0.609457 | . . . | 0.612913 |
| 0.592731 | 0.591278 | 0.637608 | 0.589696 | 0.599883 | . . . | 0.61687 |
| 0.588899 | 0.575727 | 0.651241 | 0.565023 | 0.59752 | . . . | 0.61541 |
| . . . | . . . | . . . | . . . | . . . | . . . | . . . |
| 0.358929 | 0.385122 | 0.430157 | 0.388547 | 0.433572 | . . . | 0.409521 |
| Acceleration sensor values—Y axis | | | | | | |
| 0.348141 | 0.348134 | 0.350278 | 0.352047 | 0.352523 | . . . | 0.351644 |
| 0.353501 | 0.354036 | 0.356459 | 0.357757 | 0.349234 | . . . | 0.351772 |
| 0.353039 | 0.354252 | 0.356049 | 0.357127 | 0.34612 | . . . | 0.351817 |
| 0.354184 | 0.35901 | 0.37363 | 0.39862 | 0.358178 | . . . | 0.354777 |
| 0.355393 | 0.354972 | 0.391059 | 0.404494 | 0.327742 | . . . | 0.356749 |
| . . . | . . . | . . . | . . . | . . . | . . . | . . . |
| 0.630434 | 0.625888 | 0.656932 | 0.596665 | 0.542251 | . . . | 0.51154 |
| Acceleration sensor values—Z axis | | | | | | |
| 0.608396 | 0.59816 | 0.615845 | 0.614153 | 0.603396 | . . . | 0.603012 |
| 0.564682 | 0.557402 | 0.549313 | 0.566917 | 0.577994 | . . . | 0.564071 |
| 0.570703 | 0.567903 | 0.567308 | 0.562643 | 0.57736 | . . . | 0.581324 |
| 0.533438 | 0.53271 | 0.523822 | 0.502846 | 0.547566 | . . . | 0.542095 |
| 0.494481 | 0.483082 | 0.465497 | 0.478844 | 0.541367 | . . . | 0.499828 |
| . . . | . . . | . . . | . . . | . . . | . . . | . . . |
| 0.473417 | 0.440382 | 0.508833 | 0.512475 | 0.506885 | . . . | 0.452573 |

In an embodiment of the present disclosure, the synthetically generated data from AI-based generative model has both normal and faulty sensor value data.

Referring to steps of FIG. 2, in an embodiment of the present disclosure, at step 208, the one or more hardware processors 104 validate the set of synthesized data to obtain a set of validated synthesized data. The validation may include validation of synthesized data using at least one of the two approaches. For instance, in a first approach, the step of validating the set of synthesized data to obtain the set of validated synthesized data includes/comprises performing a first comparison of (i) one or more statistical features comprised in the set of synthesized data and (ii) one or more corresponding statistical features obtained from experimental data to obtain a validation of the set of synthesized data. The first approach of validation is also referred as rule engine-based validation approach. FIG. 4, with reference to FIGS. 1 through 3, depicts a block-diagram illustrating the rule engine-based validation approach for validation of the set of synthesized data, in accordance with an embodiment of the present disclosure. In an embodiment of the present disclosure, statistical Features are used to validate the quality of the generated synthesized data. Realistic bounds of the statistical features are to be computed from small real experimental dataset or from theory and prior works. The generated synthesized data whose features are outside this bound are discarded. For rule engine, relevant statistical features and their bounds have been used to validate the quality of the generated synthesized data. The bounds are also very important aspect, and these bounds vary based on real data as well as the FEA generated simulated data—therefore, deriving the appropriate bound is also an important factor that is implemented by the system and method of the present disclosure. Some of the statistical features used and their corresponding formulas have been given in the below Table 5.

TABLE 5

| Statistical Feature | Equation |
|---|---|
| Crest Factor | $RMS_x = \sqrt{\frac{1}{N}\left[\sum_{i=1}^{N}(x_i)^2\right]}$   $CF = \frac{x_{0-pk}}{rms_x}$ <br> $RMS_x$ = root mean square of dataset x <br> $x_i$ = ith number of point in dataset x <br> CF = Crest Factor <br> pk = sample for maximum positive peak of the signal <br> $x_{0-pk}$ = value of x at pk |
| Skewness | $\tilde{\mu}_3 = \frac{\sum_i^N (X_i - \overline{X})^3}{(N-1)*\sigma^3}$ <br> $\tilde{\mu}_3$ = skewness <br> N = number of variables in the distribution <br> $X_i$ = random variable <br> $\overline{X}$ = mean of the distribution <br> $\sigma$ = standard deviation |
| Shannon Entropy | $H = -\Sigma p(x) log p(x)$ <br> x = is an event <br> p(x) = is probability of event x |
| Peak to Peak | $PP(x) = MAX(X) - MIN(X)$ |

It is to be understood by a person having ordinary skill in the art or person skilled in the art that the above examples of physical characteristics shall not be construed as limiting the scope of the present disclosure.

In the rule engine the values of the statistical features (which acts as fault condition indicators) from the generated synthesized data are computed and compared with the same feature values of the original FEA data. The output of the rule engine defines whether a generated instance is good enough i.e., matches the quality of original data. Average (±Std) of the features computed across windows (of 10 ms) for original and generated synthesized data in rule engine is shown below in Table 6 by way of examples. More specifically, Table 6 depicts a comparison of (i) one or more statistical features comprised in the set of synthesized data and (ii) one or more corresponding statistical features obtained from experimental/original data to obtain a validation of the set of synthesized data.

11

TABLE 6

| Statistical Feature | Healthy data | | Chipped tooth data | | Three worn teeth data | |
|---|---|---|---|---|---|---|
| | Original | Generated | Original | Generated | Original | Generated |
| Skewness | 0.124 | 0.126 | 0.297 | 0.431 | −0.050 | 0.117 |
| | (±0.146) | (±0.153) | (±0.255) | (±0.264) | (±0.235) | (±0.335) |
| Crest Factor | 2.348 | 1.988 | 2.678 | 2.437 | 2.657 | 2.683 |
| | (±0.259) | (±0.232) | (±0.316) | (±0.341) | (±0.274) | (±0.310) |
| Shannon Entropy | 10.865 | 11.561 | 11.566 | 13.370 | 11.735 | 12.144 |
| | (±0.607) | (±1.272) | (±0.734) | (±1.918) | (±0.761) | (±1.012) |
| Peak to Peak | 2.679 | 1.866 | 2.899 | 1.831 | 2.308 | 1.333 |
| | (±0.301) | (±0.093) | (±0.420) | (±0.112) | (±0.332) | (±0.287) |
| RMS | 0.624 | 0.491 | 0.616 | 0.407 | 0.470 | 0.274 |
| | (±0.085) | (±0.062) | (±0.100) | (±0.063) | (±0.067) | (±0.058) |

Here a real experimental dataset was used in place of the FEA data. It is to be understood by a person having ordinary skill in the art that the above statistical features shall not be construed as limiting the scope of the present disclosure.

Referring to step 208, the second approach of validation of the synthesized data is referred as AI-based validation technique wherein a comparison of (i) performance of a classifier trained using the experimental data and (ii) performance of the classifier trained is performed using the set of synthesized data to obtain the validation of the set of synthesized data. FIG. 5, with reference to FIGS. 1 through 4, depicts a block-diagram illustrating the AI-based validation technique for validation of the set of synthesized data, in accordance with an embodiment of the present disclosure. More specifically, in the AI-based validation technique, a small portion of real experimental dataset is considered, and this small portion of real experimental dataset is split into a small train set and a hidden test set. A machine learning or a deep learning model C as known in the art is trained using the small train set and the performance on the test set is inferred. The generated synthesized data is added in increasing amounts stepwise to this small train set and train the same model C. Infer the performance on the same test set. If the performance keeps on increasing with added generated data, then generated synthesized data is considered to be of good quality. Below description and tables provide details on validation using the AI-based validation technique:

12

Results:

Using 1-Nearest Neighbor (1-NN) classifier with Euclidean distance—Chipped Tooth:

TABLE 7

| Train size | Test size | Timesteps | Classes | Dimensions |
|---|---|---|---|---|
| Original data (50) + generated synthesized data - added (in equal class distribution) in multiples of 50 (50, 100, 150, and so on.) | 500 (Hidden - taken from real dataset) | 100 | 2 (healthy, Chipped tooth) | 1 |

Classifier: As known in the art ML model 1-NN using Euclidean distance was implemented by the present disclosure and its system 100 and method of FIG. 2. Also, comparison has been performed with model trained using same number of original instances without taking generated samples. The results for 1-NN using Euclidean distance with varying amount of generated train data are shown in below Tables 8 and 9, respectively by way of examples:

TABLE 8

| Data | | | Generative model—VAE | | | Generative model—variant of VAE Beta—VAE | | |
|---|---|---|---|---|---|---|---|---|
| Original | Generated | Total | Accuracy | Sensitivity | Specificity | Accuracy | Sensitivity | Specificity |
| 50 | 0 | 50 | 0.806 | 0.92 | 0.692 | 0.806 | 0.92 | 0.692 |
| 50 | 50 | 100 | 0.872 | 0.948 | 0.796 | 0.896 | 0.956 | 0.836 |
| 50 | 100 | 150 | 0.912 | 0.976 | 0.848 | 0.904 | 0.948 | 0.86 |
| 50 | 150 | 200 | 0.92 | 0.988 | 0.852 | 0.91 | 0.956 | 0.864 |
| 50 | 200 | 250 | 0.922 | 0.922 | 0.852 | 0.924 | 0.964 | 0.884 |

TABLE 9

| Data | Performance | | |
|---|---|---|---|
| Original | Accuracy | Sensitivity | Specificity |
| 50 | 0.806 | 0.92 | 0.692 |
| 100 | 0.858 | 0.928 | 0.788 |
| 150 | 0.872 | 0.952 | 0.792 |

TABLE 9-continued

| Data | Performance | | |
|---|---|---|---|
| Original | Accuracy | Sensitivity | Specificity |
| 200 | 0.886 | 0.952 | 0.82 |
| 250 | 0.892 | 0.948 | 0.836 |

It can be observed from above tables 8 and 9 that, in each case, the model trained using generated synthesized data (in addition to small portion of original data) always gave better performance than the model trained using only original data (same amount).

Using 1-NN with Euclidean Distance—3 worn Tooth:

TABLE 10

| Train size | Test size | Timesteps | Classes | Dimensions |
|---|---|---|---|---|
| Original data - to + generated synthesized data - added (in equal class distribution) in multiples of 50 (50, 100, 150, and so on.) | 500 (Hidden - taken from real dataset) | 100 | 2 (healthy, 3 worn teeth) | 1 |

Classifier: Traditional ML model 1-NN using Euclidean distance was implemented by the present disclosure and its system 100 and method of FIG. 2. Also, comparison has been performed with model trained using same number of original instances without taking generated samples. The results for 1-NN using Euclidean distance with varying amount of generated train data are shown in below tables 11 and 12:

TABLE 11

| Data | | | Generative model—VAE | | | Generative model—Beta—VAE | | |
|---|---|---|---|---|---|---|---|---|
| Original | Generated | Total | Accuracy | Sensitivity | Specificity | Accuracy | Sensitivity | Specificity |
| 50 | 0 | 50 | 0.798 | 0.936 | 0.66 | 0.798 | 0.936 | 0.66 |
| 50 | 50 | 100 | 0.812 | 0.952 | 0.672 | 0.844 | 0.956 | 0.732 |
| 50 | 100 | 150 | 0.838 | 0.984 | 0.692 | 0.848 | 0.948 | 0.748 |
| 50 | 150 | 200 | 0.866 | 0.992 | 0.74 | 0.844 | 0.924 | 0.764 |
| 50 | 200 | 250 | 0.86 | 0.988 | 0.732 | 0.872 | 0.948 | 0.796 |
| 50 | 250 | 300 | 0.878 | 0.922 | 0.764 | 0.882 | 0.96 | 0.804 |

TABLE 12

| Data | Performance | | |
|---|---|---|---|
| Original | Accuracy | Sensitivity | Specificity |
| 50 | 0.798 | 0.936 | 0.66 |
| 100 | 0.828 | 0.964 | 0.692 |
| 150 | 0.844 | 0.968 | 0.72 |
| 200 | 0.85 | 0.968 | 0.732 |
| 250 | 0.862 | 0.976 | 0.748 |
| 300 | 0.866 | 0.972 | 0.76 |

It can be observed from above tables 11 and 12, in each case, the model trained using generated synthesized data (in addition to small portion of original data) always gave better performance than the model trained using only original data (same amount).

Results on FEA Simulated Dataset:

Simulation was performed using FEA for gear-pair as mentioned above: Normal data and Faulty data (with subtle variations in fault locations)

FEA Simulated Data:

1. Small amount of Acceleration data (3-axis) has been simulated from FEA

2. Total simulated data duration from FEA: Normal data: 1 second (about 11,000 time-steps), Faulty data: 4 seconds (1 second for each subtle variation) (44,000 time-steps); segmented in windows of 128 timesteps. Normal instances: 69; Faulty instances: 349 each having 128 time-steps.

Generative Model for Data Generation

1. As an exemplary scenario a small amount of FEA generated data—[80 Instances: 35 Normal+45 faulty) passed through generative model]

2. Variant of VAE (β-VAE)

1. Validation:

a. Train set:

Normal class and Faulty class data simulated from FEA. (80 Instances: 35 Normal+45 faulty)

Generated synthesized data added stepwise (60 in each iteration) with the original 80 instances classification model is trained b. Test set:

Hidden data simulated from FEA where fault class has subtle variation from train set (121 instances: 34 Normal+87 faulty)

Classifier used: 1-NN with Euclidean distance. Evaluated on hidden test set. (Also used MLSTM-FCN shows same trend)

Below tables 13 and 14 depict performance of the system:

TABLE 13

| Training data | | | Performance of Test data | | |
|---|---|---|---|---|---|
| Original | Generated | Total | Accuracy | Sensitivity | Specificity |
| 80 | 0 | 80 | 0.331 | 1 | 0.069 |
| 80 | 60 | 140 | 0.479 | 1 | 0.276 |
| 80 | 120 | 200 | 0.553 | 1 | 0.379 |
| 80 | 217 | 297 | 0.736 | 0.971 | 0.643 |
| 80 | 400 | 480 | 0.81 | 0.971 | 0.747 |
| 80 | 800 | 880 | 0.834 | 0.971 | 0.782 |

15

TABLE 14

| Training Data | Performance | | |
|---|---|---|---|
| Original | Accuracy | Sensitivity | Specificity |
| 80 | 0.331 | 1 | 0.069 |
| 140 | 0.372 | 1 | 0.126 |
| 200 | 0.521 | 1 | 0.333 |
| 297 | 0.678 | 0.971 | 0.563 |

In the present disclosure, FEA based simulations are used to generate data for a certain set of configurations involving normal and fault conditions with a unique set of parameters and pre-condition. As FEA takes a huge amount of time to generate data, small output data from FEA is fed into a generative model (e.g., variational autoencoder based generative model also referred as VAE or generative model and interchangeably used herein) which explodes the amount of data generated. The Variational Auto-Encoder based generative model is used for synthesis of both healthy and Faulty data using the small amount of data generated using the FEA. Hence, the combination of these two help the system 100 to obtain large amount data for training robust deep learning models for synthetic machine signal analysis while keeping the quality of data high as the data generated by FEA is very close to real scenario. Most importantly when VAE generates the latent the specific characteristics/features used in FEA are embedded and optimization function or loss function are constructed—example Young's modulus, Poisson's ratio, etc. This functionality of the method and system of the present disclosure address the technical problem in terms of characteristics of the fault design. More specifically, it varies with respect to the characteristics of the fault design (e.g., refer Table 2 for fault parameter). Further, the present disclosure enables the system and method for self-correction wherein a small amount of real data/a small fraction of labelled data can be applied, with this small amount of real data it improves further its representation. Here similarity with respect to the given representation would be measured—for getting the recommended similarity the present disclosure implements a technique referred in India patent application 202021015292 titled 'METHOD AND SYSTEM FOR HIERARCHICAL TIME-SERIES CLUSTERING WITH AUTO ENCODED COMPACT SEQUENCE (AECS)' filed on 7 Apr. 2020.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
   obtaining, via one or more hardware processors, a plurality of sensor data corresponding to one or more entities, wherein an entity of the one or more entities is one or more gears of a machine, and the plurality of sensor data corresponds to a type of fault of the entity, a nature of fault of the entity, a location of fault of the entity, and geometrical data of the fault of the entity;

simulating, via a Finite Element Analysis (FEA) technique executed by the one or more hardware processors, the plurality of sensor data corresponding to the one or more entities to obtain a set of simulated data, wherein simulating the plurality of sensor data corresponding to the one or more entities is based on a real sensor dataset, wherein the real sensor dataset is a combination of input data and the plurality of sensor data, wherein simulation is performed using the FEA technique for healthy sensor data and faulty sensor data of a machinery;

synthesizing, via a variational autoencoder based generative model executed by the one or more hardware processors, the set of simulated data to obtain a set of synthesized data, wherein synthesizing the set of simulated data comprises synthesizing the healthy sensor data and the faulty sensor data comprised in the set of simulated data, and wherein the step of synthesizing by the variational autoencoder based generative model comprises:

generating a latent representation of the set of simulated data; and embedding one or more physical characteristics corresponding to the one or more entities into the generated latent representation and an associated loss function, wherein synthetically generated data from the variational autoencoder based generative model comprises the healthy sensor data and the faulty sensor data; and validating the set of synthesized data to obtain a set of validated synthesized data, wherein the step of validating comprises at least one of:

performing a first comparison of (i) one or more statistical features comprised in the set of synthesized data and (ii) one or more corresponding statistical features obtained from experimental data to obtain a validation of the set of synthesized data;

computing realistic bounds of the one or more statistical features for the synthesized data and discarding the one or more statistical features that are outside the realistic bounds, wherein the realistic bounds are based on the real sensor data and the FEA generated simulated data; and performing a second comparison of (i) performance of a classifier trained using the experimental data and (ii) performance of the classifier trained using the set of synthesized data to obtain a validation of the set of synthesized data, wherein the generated synthesized data is added in increasing amounts stepwise to a portion of the real sensor dataset;

feeding, via the one or more hardware processors, a portion of the simulated sensor data to the variational autoencoder based generative model that includes the set of synthesized data to generate both the healthy sensor data and the faulty sensor data;

training, via the one or more hardware processors, a plurality of deep learning models using the healthy sensor data and the faulty sensor data, for synthetic machine signal analysis while keeping a quality of data high as the data generated by the FEA is very close to real scenario; and using, via the one or more hardware processors, the trained deep learning model for self-correction of the real sensor data which aids in better fault diagnosis of the machinery.

2. The processor implemented method of claim 1, wherein the one or more physical characteristics comprise at least one of an Elasticity, a Young's modulus, a Poisson's ratio, an Addendum coefficient, a Tip clearance coefficient, a face width, a pressure angle, and a hub bore radius.

3. A system, comprising:

a memory storing instructions;

one or more communication interfaces; and one or more hardware processors coupled to the memory via the one or more communication interfaces, wherein the one or more hardware processors are configured by the instructions to:

obtain a plurality of sensor data corresponding to one or more entities, wherein an entity of the one or more entities is one or more gears of a machine, and the plurality of sensor data corresponds to a type of fault of the entity, a nature of fault of the entity, a location of fault of the entity, and geometrical data of the fault of the entity;

simulate, via a Finite Element Analysis (FEA) technique, the plurality of sensor data corresponding to the one or more entities to obtain a set of simulated data, wherein simulating the plurality of sensor data corresponding to the one or more entities is based on a real sensor dataset, wherein the real sensor dataset is a combination of input data and the plurality of sensor data, wherein simulation is performed using the FEA technique for healthy sensor data and faulty sensor data of a machinery;

synthesize, via a variational autoencoder based generative model, the set of simulated data to obtain a set of synthesized data, wherein synthesizing the set of simulated data comprises synthesizing the healthy sensor data and the faulty sensor data comprised in the set of simulated data, and wherein the set of simulated data is synthesized by:

generating a latent representation of the set of simulated data; and embedding one or more physical characteristics corresponding to the one or more entities into the generated latent representation and an associated loss function, wherein synthetically generated data from the variational autoencoder based generative model comprises the healthy sensor data and the faulty sensor data; and validate the set of synthesized data to obtain a set of validated synthesized data, wherein the set of synthesized data is validated by at least one of:

performing a first comparison of (i) one or more statistical features comprised in the set of synthesized data and (ii) one or more corresponding statistical features obtained from experimental data to obtain a validation of the set of synthesized data;

computing realistic bounds of the one or more statistical features for the synthesized data and discarding the one or more statistical features that are outside the realistic bounds, wherein the realistic bounds are based on the real sensor data and the FEA generated simulated data; and performing a second comparison of (i) performance of a classifier trained using the experimental data and (ii) performance of the classifier trained using the set of synthesized data to obtain a validation of the set of synthesized data, wherein the generated synthesized data is added in increasing amounts stepwise to a portion of the real sensor dataset;

feed a portion of the simulated sensor data to the variational autoencoder based generative model that includes the set of synthesized data to generate both the healthy sensor data and the faulty sensor data;

train a plurality of deep learning models using the healthy sensor data and the faulty sensor data, for synthetic machine signal analysis while keeping a quality of data high as the data generated by the FEA is very close to real scenario; and use the trained deep learning model for self-correction of the real sensor data which aids in better fault diagnosis of the machinery.

4. The system of claim 3, wherein the one or more physical characteristics comprise at least one of an Elasticity, a Young's modulus, a Poisson's ratio, an Addendum coefficient, a Tip clearance coefficient, a face width, a pressure angle, and a hub bore radius.

5. One or more non-transitory machine-readable information storage mediums comprising one or more instructions which when executed by one or more hardware processors cause:

obtaining, a plurality of sensor data corresponding to one or more entities, wherein an entity of the one or more entities is one or more gears of a machine, and the plurality of sensor data corresponds to a type of fault of the entity, a nature of fault of the entity, a location of fault of the entity, and geometrical data of the fault of the entity;

simulating, via a Finite Element Analysis (FEA) technique executed by the one or more hardware processors, the plurality of sensor data corresponding to the one or more entities to obtain a set of simulated data, wherein simulating the plurality of sensor data corresponding to the one or more entities is based on a real sensor dataset, wherein the real sensor dataset is a combination of input data and the plurality of sensor data, wherein simulation is performed using the FEA technique for healthy sensor data and faulty sensor data of a machinery;

synthesizing, via a variational autoencoder based generative model executed by the one or more hardware processors, the set of simulated data to obtain a set of synthesized data, wherein synthesizing the set of simulated data comprises synthesizing the healthy data and the faulty sensor data comprised in the set of simulated data, wherein synthesizing the set of simulated data comprises synthesizing healthy sensor data and faulty sensor data comprised in the set of simulated data, and wherein the step of synthesizing by the variational autoencoder based generative model comprises:

generating a latent representation of the set of simulated data; and embedding one or more physical characteristics corresponding to the one or more entities into the generated latent representation and an associated loss function, wherein synthetically generated data from the variational autoencoder based generative model comprises the healthy sensor data and the faulty sensor data; and validating the set of synthesized data to obtain a set of validated synthesized data, wherein the step of validating comprises at least one of:

performing a first comparison of (i) one or more statistical features comprised in the set of synthesized data and (ii) one or more corresponding statistical features obtained from experimental data to obtain a validation of the set of synthesized data;

computing realistic bounds of the one or more statistical features for the synthesized data and discarding the one or more statistical features that are outside the realistic bounds, wherein the realistic bounds are based on the real sensor data and the FEA generated simulated data; and performing a second comparison of (i) performance of a classifier trained using the experimental data and (ii) performance of the classifier trained using the set of synthesized data to obtain a validation of the set of synthesized data;

feeding, a portion of the simulated sensor data to the variational autoencoder based generative model that includes the set of synthesized data to generate both the healthy sensor data and the faulty sensor data;

training, a plurality of deep learning models using the healthy sensor data and the faulty sensor data, for synthetic machine signal analysis while keeping a quality of data high as the data generated by the FEA is very close to real scenario; and using the trained deep learning model for self-correction of the real sensor data which aids in better fault diagnosis of the machinery.

6. The one or more non-transitory machine-readable information storage mediums of claim 5, wherein the one or more physical characteristics comprise at least one of an Elasticity, a Young's modulus, a Poisson's ratio, an Addendum coefficient, a Tip clearance coefficient, a face width, a pressure angle, and a hub bore radius.

7. The processor implemented method of claim 1, wherein the FEA technique is used for simulation of working of machinery parts including gear, bearing, shafts, wherein the plurality of sensor data simulated by the FEA technique includes the type of fault: localized, distributed, the nature of fault: low cycle, high cycle, the location of fault: bearing, gear, shaft, the geometrical data of fault: length, width, radius, and sensor: accelerometer.

* * * * *